Oct. 21, 1941.    H. LONG    2,259,899
UNIVERSAL TOOL
Filed Sept. 24, 1938    3 Sheets-Sheet 1
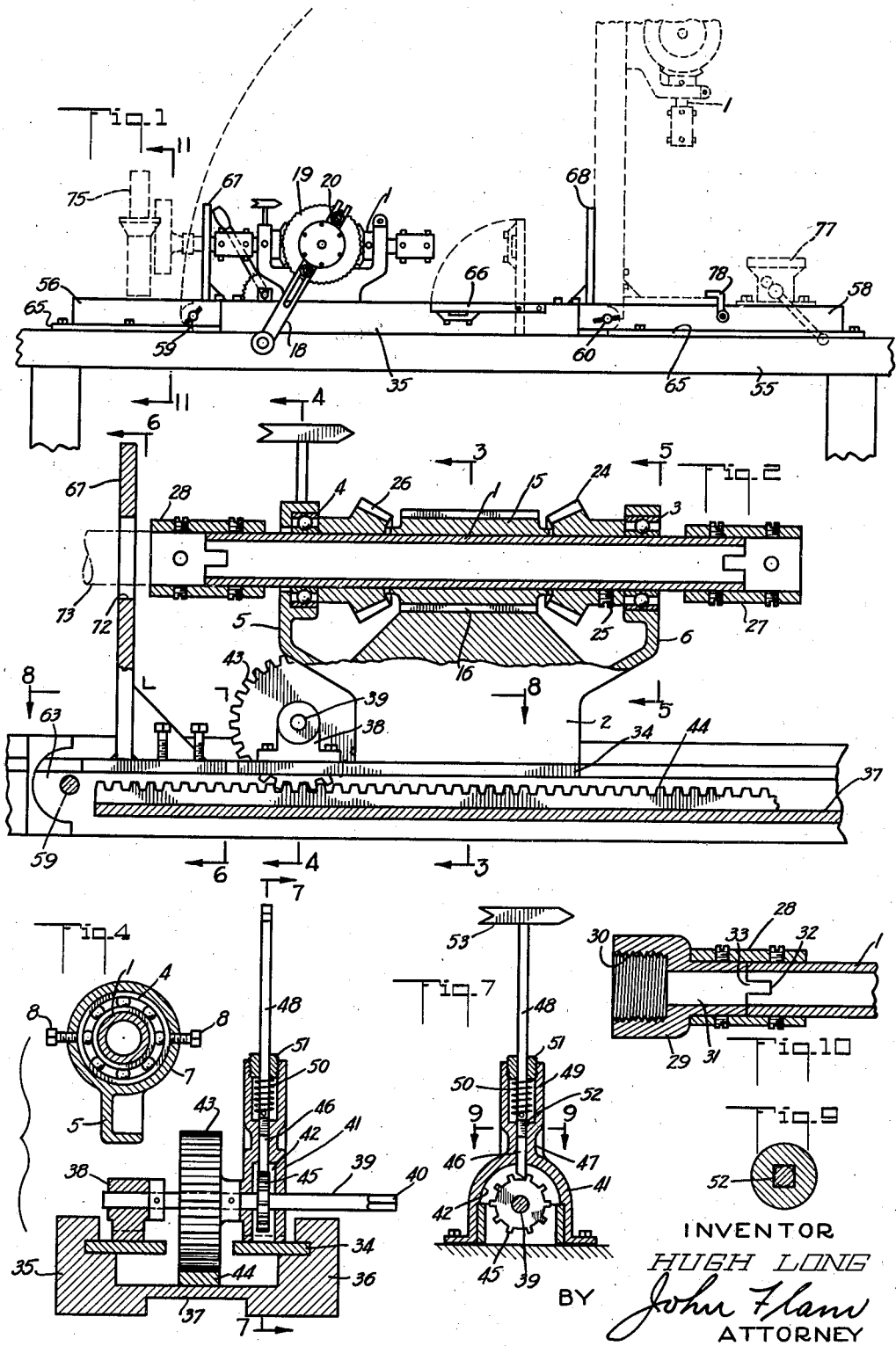
INVENTOR
*HUGH LONG*
BY *John Flann*
ATTORNEY

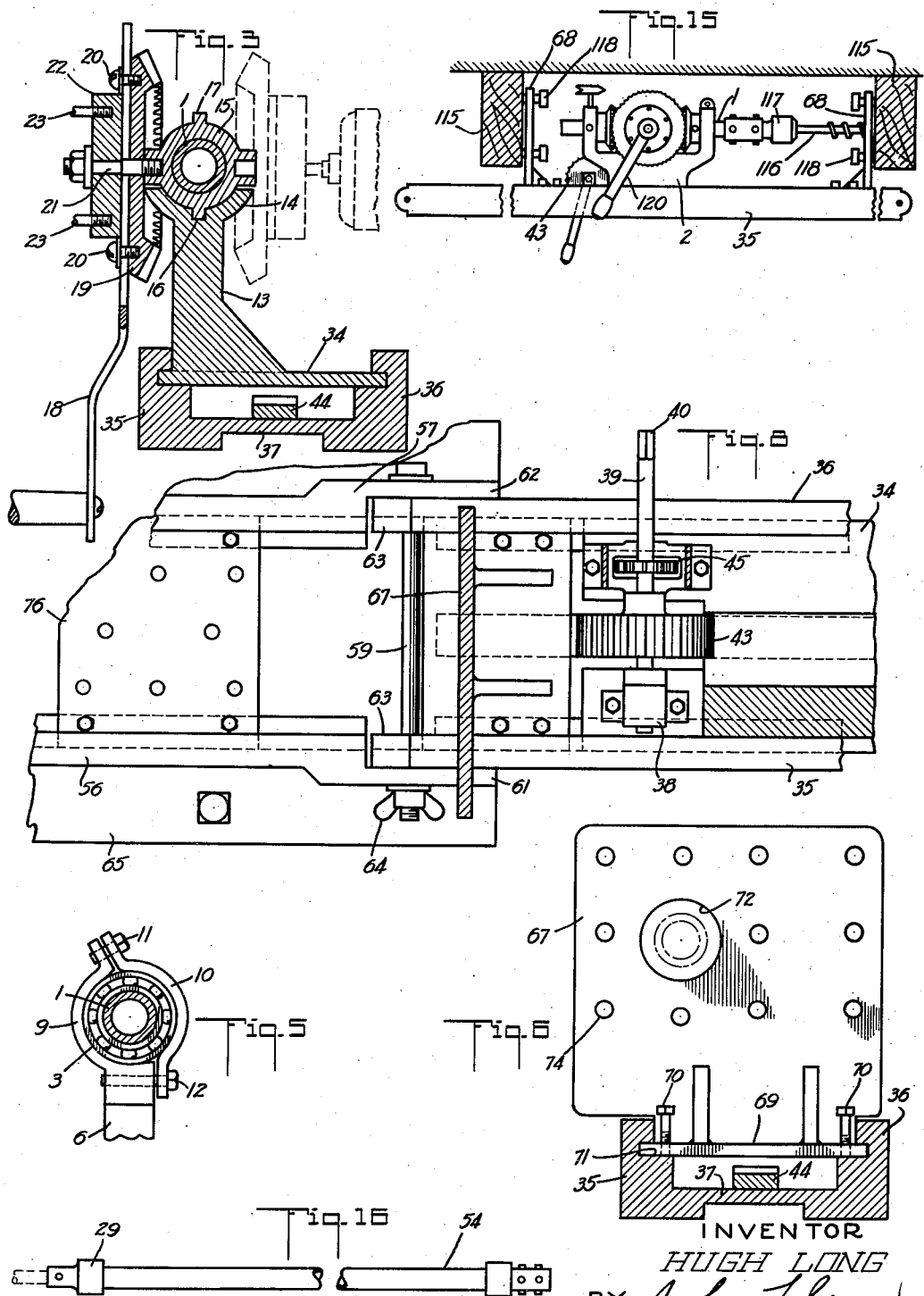

Oct. 21, 1941.   H. LONG   2,259,899
UNIVERSAL TOOL
Filed Sept. 24, 1938   3 Sheets-Sheet 3
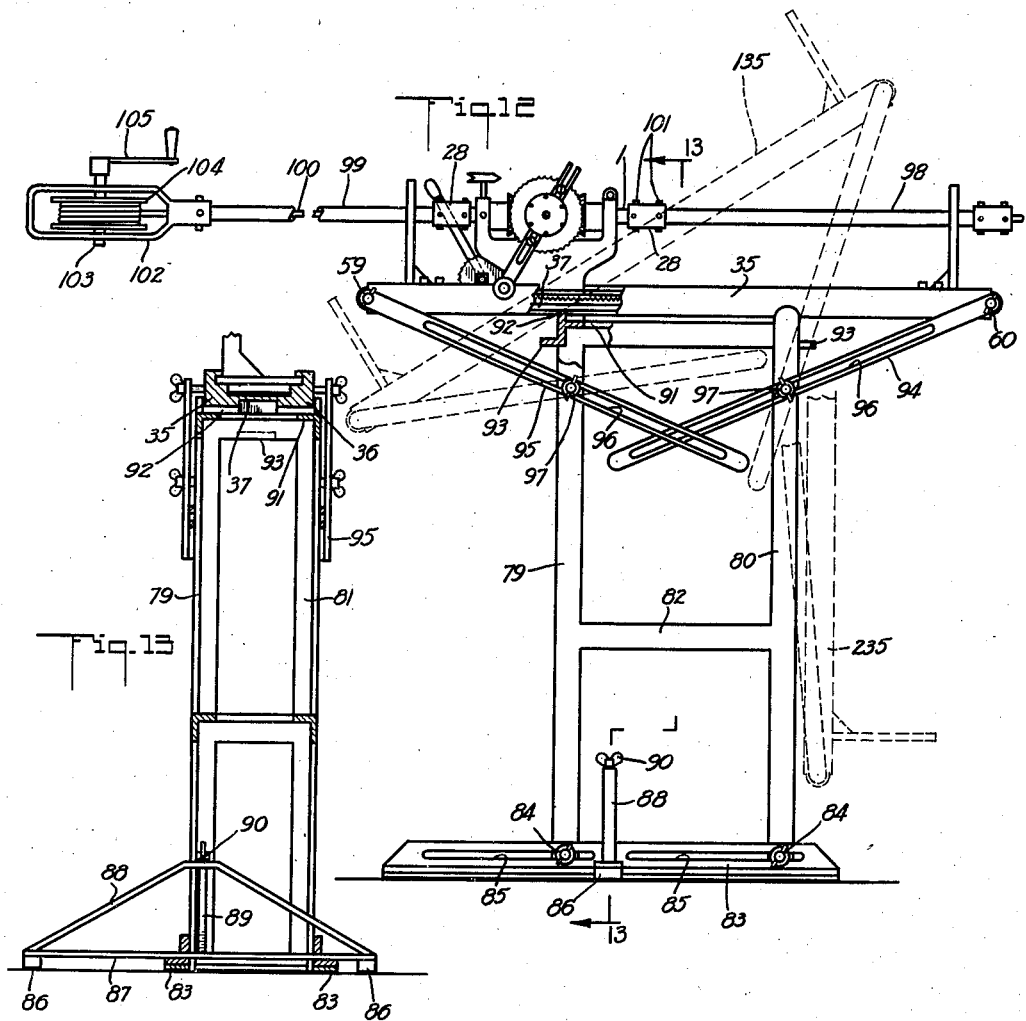
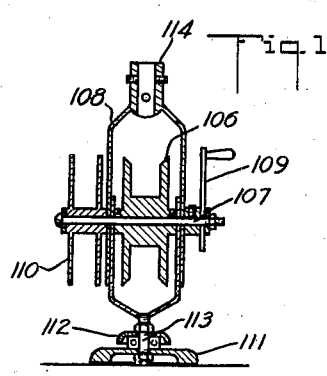
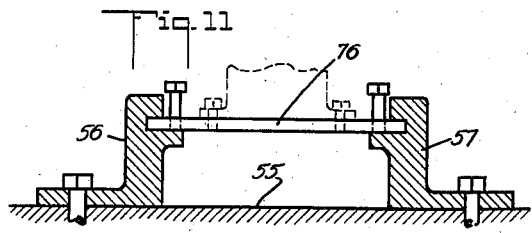
INVENTOR
HUGH LONG
BY John Flanv
ATTORNEY Patented Oct. 21, 1941

2,259,899

UNITED STATES PATENT OFFICE 2,259,899

UNIVERSAL TOOL

Hugh Long, Los Angeles, Calif.

Application September 24, 1938, Serial No. 231,558

15 Claims. (Cl. 29—26)

This invention relates to a universal tool drive; and more particularly to a device that is adapted to be used not only in a shop, but on farms, in the home, and as a portable tool for use on the job by plumbers or other mechanics.

It is one of the objects of this invention to provide a compact and inexpensive device of this general character, and adapted to various uses, such as for lathe work, for drilling, and for rotation of plumber's specialty tools, such as drain snakes, sewer cleaners, tree root drills, etc.

In accomplishing these results, use is made of a drive shaft structure and its support of such nature as to be quite readily adjustable to conform to the particular work imposed upon the drive. For example, the shaft may be made hollow so that when required it may grip a tool or device passing through the shaft; such as a root cutter rod or a snake. Accordingly, it is another object of this invention to make it possible to utilize the shaft effectively by coupling it to the tool either by the aid of a chuck or by gripping a tool or device passing therethrough.

It is still another object of this invention to provide a tool driving device of this general character that has a driving axis adjustable to a very wide variety of positions as necessitated for operations by plumbers or mechanics.

This invention possesses many other advantages, and has other objects which may be made more easily apparent from a consideration of one embodiment of the invention. For this purpose there is shown a form in the drawings accompanying and forming part of the present specification. This form will now be described in detail, illustrating the general principles of the invention; but it is to be understood that this detailed description is not to be taken in a limiting sense, since the scope of this invention is best defined by the appended claims.

In the drawings:

Figure 1 is an elevation, showing the tool driver in operative position on a bench;

Fig. 2 is a transverse section of the driver on an enlarged scale;

Figs. 3, 4, 5 and 6 are cross sections as seen on correspondingly numbered planes of Fig. 2;

Fig. 7 is a cross section as seen on plane 7—7 of Fig. 4;

Fig. 8 is a fragmentary plan view as seen on plane 8—8 of Fig. 2;

Fig. 9 is a detail section as seen on plane 9—9 of Fig. 7;

Fig. 10 is a detail section of one form of driving connection for the tool driver;

Fig. 11 is a cross section as seen on plane 11—11 of Fig. 1;

Fig. 12 is an elevation of a stand for supporting the tool;

Fig. 13 is a cross section as seen on plane 13—13 of Fig. 12;

Fig. 14 is a detail view of a reel for use in connection with the driver;

Fig. 15 is a detail view showing the driver in use under certain conditions; and Fig. 16 is a detail view showing an extension for use with the driver.

The details of the shaft structure utilized in connection with the invention may be best disclosed in connection with Figs. 2, 3, 4 and 5. There is a hollow shaft 1 that is intended to be rotated, and rotatably supported, as on a carriage 2. The shaft 1 for this purpose is indicated as having mounted thereon the inner races of the spaced ball bearing structures 3 and 4. The outer races are respectively carried on oppositely disposed arms 5 and 6 shown in this instance as integral with the carriage 2. These outer races are shown as quickly detachable from the arms of carriage 2. In this way it is possible to remove and replace the rotary shaft 1 with respect to the carriage 2 so that it may be utilized in a variety of ways.

For example, the ball bearing structure 4 is shown in Fig. 4 as maintained within the flange 7 on the arm 5 by the aid of a pair of diametrically opposite set screws 8 extending through the flange 7. Similarly, as shown in Fig. 5, the arm 6 is provided with a segmental saddle 9 in which is disposed the outer race of the ball bearing structure 3. A cap 10 attached as by screws 11 and 12 maintains the ball bearing structure 3 tightly in its saddle 9. However, by appropriate manipulation of the set screws 8 and the screws 11 and 12, the shaft 1 with the ball bearing structures 3 and 4 may be removed as an entirety from the carriage 2.

The carriage 2 serves also, however, to provide a pedestal for an additional intermediate support or rest for the shaft 1. This pedestal 13 is shown to best advantage in Figs. 2 and 3. The pedestal is provided at its upper end with a segmental saddle 14. Resting within this saddle is a bushing or barrel 15 through which the shaft 1 passes, but without being journaled therein. For further assuring accurate alinement on the saddle 14, the bushing 15 may be provided with a spline 16. Furthermore, in order to make it possible to reverse the position of the shaft 1 with respect to the saddle 14, an oppositely disposed spline 17 on bushing 15 may be provided.

One of the features of the invention resides in the manner in which a rotary force may be applied to the shaft 1 after it has been appropriately placed and fastened in position on the carriage structure. In Figs. 1, 2 and 3, the rotary motion is shown as imparted by the aid of a hand crank 18 mounted upon the back of a bevel driving gear 19, as by the aid of the screws 20. These screws engage in slots on the handle member 18 so that the effective leverage of the handle member may be to some extent adjusted. The bevel gear 19 in turn has an axis normal to the shaft axis and is supported for free rotation about a stud 21 threaded into the bushing or barrel 15. This stud 21 has a reduced portion upon which is supported a disk 22, to which may be attached, if desired, any conventional type of ratchet mechanism, as by the aid of the studs 23.

The bevel gear 19 operatively engages a bevel pinion 24 (Fig. 2) that is fixed to the shaft 1 as by the aid of the set screw 25. An oppositely directed bevel gear 26 is freely rotatable upon the shaft 1 and serves to stabilize the operation of the driving bevel gear 19.

By providing a pair of tapped apertures on diametrically opposite sides of the bushing 15, for the accommodation of the supporting stud 21, it is possible to change the position of the handle 18 as desired; and it is also possible to provide a support for the means for driving the shaft 1, such as a motor or the like.

The shaft 1 is made hollow in order to permit various elements to pass therethrough and, if necessary, to drive such elements. Alternatively the shaft 1 may be provided with coupling sleeves 27 and 28 at each end, by the aid of which additional shaft lengths or the like may be coupled to the shaft 1. Or if desired, the couplings 27 or 28 may be provided with appropriate chucking devices for rotation of drills or the like in a well understood manner.

In the form of attachment illustrated in Fig. 10, the shaft 1 and the coupling sleeve 28 are shown as providing a support for a threaded coupler 29. Into the threaded socket 30 of this coupler may be screwed any appropriate tool holding device. The shank 31 for the coupler 29 is shown as hollow and telescoped within the coupling member 28. It may be keyed into the kerf 32 provided at the end of the shaft 1, as by the aid of the integral projections 33, formed on the hollow wall of the coupler.

As illustrated in Fig. 16, the coupler 29 may serve to carry, for example, additional shaft lengths 54.

As thus described, it is seen that the shaft 1 serves at least partially to support, by the aid of the barrel 15, the means for imparting rotary motion to the shaft. Accordingly, the shaft with its driving mechanism may be quickly removed from the carriage 2 and may be utilized in other relations.

The carriage 2 is arranged to be advanced or retracted, as for example by causing the tool carried by the shaft 1 to traverse work held in proper fixed relation to the carriage.

Thus for example, the carriage 2 is shown as being povided with a bottom plate 34 (Figs. 2 and 3). This bottom plate operates in a guide so as to slide therein. This guide for example may be in the form of a pair of side members or rails 35 and 36, provided with appropriate slots to engage opposite edges of the plate 34 and integrally joined by a bottom flange 37.

The carriage 2 may be advanced as desired with respect to these guide rails by the aid of a rack and pinion drive. Thus for example, the plate 34, as shown most clearly in Figs. 2 and 4, may have attached to it a bearing standard 38. In this bearing standard is rotatably supported a shaft 39, having a square end 40 for the accommodation of a hand manipulatable wrench. The shaft 39 is also supported at its end opposite the standard 38, by the aid of the standard illustrated most clearly in Figs. 4 and 7. This standard 41 is likewise shown as supported upon and attached to the plate 34. It is provided with a hollow space 42 for the accommodation of mechanism hereinafter to be described. The shaft 39 carries the pinion 43. This pinion meshes with the rack 44 fastened to the top of the connecting flange 37. In order to permit this engagement, the plate 34 is shown as slotted for the passage of the lower end of the pinion 43.

By appropriate rotation of the shaft 39 it is possible to move the carriage 2 with its shaft 1 in a direction parallel to the axis of that shaft. If desired, mechanism may be provided to prevent motion of the carriage in one direction or the other. This may be accomplished for example, by the aid of an appropriate ratchet mechanism.

Thus the shaft 39 carries a toothed ratchet wheel 45. The teeth of the ratchet have straight sides, and are spaced from each other. The teeth of this ratchet wheel are adapted to be engaged by a pawl 46 which is guided for movement in the boss 47 projecting above the standard 41. The pawl 46 has a stem 48 passing through the enlarged cylindrical portion 49 of the boss 47. In this cylindrical portion 49 a compression spring 50 may be used for urging the pawl 46 continually in a downward direction. The pressure of this spring is shown as regulatable by a hollow nut 51 threaded into the cylinder 49 and through which the handle 48 passes. The lower face of the pawl 46 slopes so as to permit the teeth of the ratchet wheel 45 to pass under the end to raise it when the wheel 45 rotates in one direction; but its lower edge serves effectively to block reverse rotation. In the position illustrated in Fig. 7, clockwise rotation of the shaft 38 is permitted, and counterclockwise rotation is prevented.

By the aid of the stem 48, however, the direction of restraint may be changed. For this purpose the pawl 46 is provided with a square portion 52 (Fig. 9) sliding in a corresponding square aperture in the bottom of the cylinder 49. By lifting the stem 48 and turning it 180°, the position of the sloping face of the pawl 46 may be correspondingly changed. To indicate in which direction the carriage 2 is permitted to be moved, the stem 48 may carry a pointer 53 which may also serve conveniently as a hand grasp for manipulating the stem.

The guide structure including rails 35 and 36 and the bottom flange 37, with the carriage 2, and the shaft structure supported thereon, may be readily transported from place to place. For this purpose the guide is shown as detachably mounted upon a table structure 55 (Fig. 1). This table structure 55 is provided with supplemental rail guide members 56 and 57 (Figs. 1 and 8) adjacent the left hand end of the apparatus and serving as continuations of the rails 35 and 36. Similarly, at the right hand end of the apparatus guide rails 58 (Fig. 1) may be provided. The guide structure 35, 36, 37, may be detachably joined to the extension rails 56, 57, etc., as for example by the aid of pivot bolts 59 and 60 respectively at the left and right hand end of the guide structure. These pivot bolts pass through flanges such as 61, 62, formed on the extension rails, as well as through appropriate ear extensions such as 63 formed on the guide rails 35, 37. These bolts may be readily loosened and removed manually as by appropriate manipulation of the wing nuts 64. The supplemental rails 56, 57, 58, etc. may be appropriately bolted as through their flanges 65 on the top of the table structure 55, so as to provide a permanent structure.

In the assembly, as illustrated in Fig. 1, the mechanism may be used for such operations as lathe work or drill work. When used for lathe work, a tool holder 66 may be utilized for clamping an appropriate tool in proper position with respect to the work carried by the shaft structure. This holder is pivotally supported, so that it may be rotated out of the way. Furthermore, adjustable supporting plates may also be slidably supported within the guide for appropriately supporting work or the like. These plates 67 and 68 are shown to best advantage in Figs. 2, 6 and 8. They are shown as having a vertical portion and a horizontal slide portion 69 accommodated within the guide rails and capable of being clamped in position as by the aid of a plurality of set screws 70. The set screws pass through the slide and engage the horizontal shoulders 71 formed on the guide rails 35, 36, 37. As shown more clearly in Figs. 2 and 6, a clearance aperture 72 is provided to permit the passage therethrough of the shaft 1 or any extension 73 thereof. The supporting plates 67, 68 may thus be moved in a direction parallel to the axis of the shaft structure. It may provide, for example, an appropriate support for miscellaneous equipment to be driven by shaft 1, as by the aid of appropriately spaced tapped holes 74 (Fig. 6).

In Fig. 1 the shaft structure 1 is shown as connected to a grinder wheel mechanism 75. The frame of this grinder wheel may appropriately be supported on a supporting slide 76 accommodated in the guide rails 56, 57 (Figs. 8 and 11).

Other mechanism adapted to cooperate with the shaft structure may be appropriately supported on other parts of the guides; for example, in Fig. 1 a vise 77 is shown which may be supported appropriately on another slide cooperating with rails 58.

With the axis of shaft 1 in the horizontal position disclosed in Figs. 1 and 2, the apparatus may be used for a variety of purposes, such as drilling or lathe work. However, it is possible to tilt the guide structure about the axis of either of the fastening bolts 59 and 60. In Fig. 1 there is illustrated a vertical arrangement (in dotted lines) of the shaft mechanism. This is done by simply tilting the guide structure 35, 36, 37, etc. about the axis of the bolt 60. The supporting plate 68 for this purpose may be appropriately positioned with respect to the axis of bolt 60 in such a way that upon moving the guide structure in a clockwise direction, the right hand surface of the supporting plate 68 will engage the top of the guide rails 58. In this position it will serve as an appropriately solid base for the vertically disposed structure. Catches such as indicated at 78 may be provided for preventing inadvertent disturbance of the vertical position. In this position the shaft 1 with its associated drive mechanism may be utilized as a vertical drill press.

In many instances plumbers are required to operate a "snake"; this is in the nature of a long jointed or flexible element adapted to carry appropriate tools at its end for clearing clogged sewers or drains. For such purposes the snake should be rotated, and it may be at the same time advanced or retracted with respect to the drain. In view of the fact that the guide structure 35, 36, 37 and the apparatus supported thereon are comparatively light in weight, it is possible to lift the whole apparatus off of the bench or table 55 and to use it in connection with a lighter portable stand. Such an arrangement is illustrated in Figs. 12 and 13. In these figures a stand is shown having an upright frame including upright members such as 79, 80, 81, etc. The frame is also provided with transverse braces 82. The bottom ends of the uprights 79, 80, 81 are shown as joined adjustably to the pedestal 83, as by the aid of a slot and bolt connection. Thus for example the uprights may carry the bolts 84 passing through the horizontal slots 85 in pedestal 83 and held in clamping position as by wing nuts. If desired, supplemental transverse bracing may be provided for the frame work, including the base member 86, connecting horizontal brace 87, and the arch brace 88. The center of the arch may be further braced by the aid of the upright stud 89, which may be provided with the wing nut 90 engaging the stud 89. The base member 86 and the horizontal brace 87 may be appropriately and permanently joined to the pedestal 83.

At the top end of the portable stand there is a horizontal frame 91 formed of angle irons and having vertical projections 92, as well as the horizontal projections 93. The guide 35 is shown in Fig. 12 as resting upon the vertical projections 92 of the frame 91. These projections thus serve to steady and aline the structure by engaging in the channel extending below flange 37. The guide structure may be held rigidly in this position by the aid of the links 94, 95, that are provided with longitudinal slots 96. Through these slots may be passed attaching bolts 97 anchored in the upright members 79, 80, 81, etc. The other ends of the links are pivotally joined in the ears provided at the ends of the rails 35, 36, by the aid of the bolts 59 and 60.

In Fig. 12 the driving shaft 1 is shown as having an extension 98 extending toward the right; and another extension 99 extending toward the left. Through this extension is indicated a snake 100. This snake may be appropriately anchored to be rotated by the rotation of the shaft 1, as by having the set screws 101 of the coupling sleeves 28 engaging the snake. This snake may be appropriately provided at its free end with any desired tool.

The left hand end of the shaft extension 99 is shown as provided with a frame 102 pivotally supporting the shaft 103 of a reel 104. The snake 100 may be wound as desired on the reel 104 by aid of the crank 105. Thus if shaft 1 is rotated, the reel structure also rotates.

In place of the snake 100 the mechanism may be used to operate a long drill rod for drilling through tree roots or the like that may be located in sewers or drains. Furthermore, by appropriate manipulation of the linkages, the angular position of the guide structure 35, 36, 37, may be varied. For example, it may be tilted as indicated by the position 135 of the guide structure; or in fact, the guide may be maintained in a vertical position as indicated at dotted position 235, so as to provide a vertical axis of rotation. Under such circumstances the horizontal projection 93 may serve appropriately as steadying means engaging the channel in the bottom of the guide structure.

In Fig. 14, another form of reel structure is illustrated in which the reel 106 is shown as fastened to the shaft 107 extending through the walls of the housing 108. The crank 108 serves to manipulate the reel. At the left hand end of the shaft 107 there is detachably mounted exterior of the housing 108 a supplemental storage reel 110 to permit storing different sized snakes that may not be in active use. Furthermore, the housing 108 is shown as supported for vertical rotation upon a stand 111 by the aid of the thrust ball bearings 112. These thrust ball bearings are disposed around the central stud 113 depending from the housing 108. This reel structure illustrated in Fig. 14 may be disposed apart from the rotary shaft mechanism as desired, and the snake or other device may pass upwardly through the upper socket 114, and then into the hollow shaft structure.

In Fig. 15 there is illustrated another manner of using this device. In this instance, the rotary shaft 1 and the guide structure 35, etc. are shown as supported by the aid of the supporting plates 68 on the vertical studs 115, as provided in the wall of a building. These plates are held in place by the clamp screws 118 passing through tapped holes 74. In this position the device may be used for operating a drill 116 by the aid of a chuck 117, for drilling holes in the studs in appropriate locations for the passage of pipes, etc. The rotation of the drill 116 is effected by a ratchet handle mechanism 120 and the advancing of the drill is accomplished as before by advancing the carriage 2 by rotation of the pinion 43.

Other uses for the device will suggest themselves. Enough has been said, however, to indicate the universal application of the device.

What is claimed is:

1. In a device of the character described, a shaft structure, a carriage for the shaft structure, said carriage having a saddle rest for the shaft structure, as well as arms at each end thereof, bearing members for the shaft structure, detachably supported by the arms, said structure being retained on the carriage in a detachable manner, and being removable together with the bearing members as a unit from the carriage, and means for moving the carriage in a direction parallel to the shaft structure axis.

2. In a device of the character described, a shaft structure, a carriage for the shaft structure, said carriage having a saddle rest for the shaft structure, as well as arms at each end thereof, bearing members for the shaft structure, detachably supported by the arms, said structure being retained on the carriage in a detachable manner, and being removable together with the bearing members as a unit from the carriage, means for moving the carriage in a direction parallel to the shaft axis, and means, supported by aid of the shaft structure, for imparting rotation to the shaft structure.

3. In a device of the character described, a shaft, a carriage for supporting the shaft, and means, supported by the aid of the shaft, for imparting rotation to the shaft, comprising a barrel surrounding the shaft, and a transmission mechanism having an element carried by the barrel, said shaft and barrel being detachable from the carriage as a unit.

4. In a device of the character described, a carriage, a rotary shaft supported by the carriage, means supported by aid of the shaft for imparting rotary motion to the shaft, a guide for the carriage, and a support for the guide, comprising links for adjusting the position of the guide, and joining the support and the guide.

5. In a device of the character described, a guide including a pair of rails, a carriage slidably supported on the rails, means for moving the carriage along the rails, means for locking the carriage against movement, a shaft rotatably mounted on the carriage, means on the carriage adapted to drive the shaft, means for operatively connecting the shaft to the tool to be driven, a support for the guide, means adapted to be secured to the guide adjacent the end thereof to anchor the guide to the support, said last mentioned means also including a pair of rails, and a plate adapted to be adjustably secured to the said last mentioned rails, said plate being arranged to have mounted thereon a tool to cooperate with the shaft.

6. In a device of the character described, a guide including a pair of rails, a carriage slidably supported on the rails, means for moving the carriage along the rails, means for locking the carriage against movement, a shaft rotatably mounted on the carriage, means on the carriage adapted to drive the shaft, means for operatively connecting the shaft to the tool to be driven, means adapted to be secured to the guide adjacent the end thereof to anchor the guide to the support, and means forming a hinge between the anchoring means and the guide, whereby the guide may be swung about the anchoring means.

7. In a device of the character described, a guide including a pair of rails, a carriage slidably supported on the rails, means for moving the carriage along the rails, means for locking the carriage against movement, a shaft rotatably mounted on the carriage, means on the carriage adapted to drive the shaft, means for operatively connecting the shaft to the tool to be driven, a support for the guide, anchoring means secured to the support adjacent the opposite ends of the guide, the end of the guide and the associated anchoring means having interengaging members forming a hinge, and a pin in the hinge, said hinge pins being removable, whereby, upon removal of one of the pins, the guide may be swung on the other pin.

8. In a device of the character described, a guide including a pair of rails, a carriage slidably supported on the rails, means for moving the carriage along the rails, means for locking the carriage against movement, a shaft rotatably mounted on the carriage, means on the carriage adapted to drive the shaft, means for operatively connecting the shaft to the tool to be driven, a support for the guide, means adapted to be secured to the guide adjacent the end thereof to anchor the guide to the support, a plate substantially perpendicular to the shaft and adjustably movable on the rails adjacent one end of the guide, the plate being adapted to cooperate with the anchoring means to support the guide with the shaft substantially perpendicular to the support.

9. In a device of the character described, a guide including a pair of rails, a carriage slidably supported on the rails, means for moving the carriage along the rails, means for locking the carriage against movement, a shaft rotatably mounted on the carriage, means on the carriage adapted to drive the shaft, means for operatively connecting the shaft to the tool to be driven, a pair of plates substantially perpendicular to the shaft and adjustably secured to the rails respectively adjacent opposite ends of the shaft, and threaded members cooperating with the respective plates, whereby the plates may serve, optionally, to support work on the guide, or to support the guide on the work.

10. In a device of the character described, a guide including a pair of rails, a carriage slidably supported on the rails, means for moving the carriage along the rails, means for locking the carriage against movement, a shaft rotatably mounted on the carriage, means on the carriage adapted to drive the shaft, means for operatively connecting the shaft to the tool to be driven, and a support for the guide, said support comprising a stand, and means for securing the guide to the stand, said means being adjustable, whereby the axis of the shaft may be disposed vertically, or horizontally or at an intermediate position.

11. In a device of the character described, a guide including a pair of rails, a carriage slidably supported on the rails, means for moving the carriage along the rails, means for locking the carriage against movement, a shaft rotatably mounted on the carriage, means on the carriage adapted to drive the shaft, means for operatively connecting the shaft to the tool to be driven, and a support for the guide, said support comprising a frame, and links pivotally secured to opposite ends of the guide, said links being adjustably attached to the frame, whereby the position of the guide on the frame may be altered, and means for securing the links in adjusted position.

12. In a device of the character described, a rotary shaft structure, a guide for the carriage, a main support for the guide, means whereby the guide may be angularly adjusted about an axis with respect to the main support, and a supplemental supporting means for the guide adjustably mounted on the main support.

13. In a device of the character described, a rotary shaft structure, a carriage for the structure, a guide for the carriage, a main support for the guide, means whereby the guide may be angularly adjusted about an axis with respect to the main support, and a bracket being capable of being guided optionally on the main support or on the guide for providing a supplemental supporting means for the guide.

14. In a device of the character described, a rotary shaft structure, a carriage for the structure, a guide for the carriage, a support for the guide, means whereby the guide may be angularly adjusted about an axis transverse to the shaft axis, and a bracket adapted to serve as an additional support for the guide in one of its angular positions.

15. In a device of the character described, a rotary shaft structure, a carriage for the structure, a guide for the carriage, a support for the guide, means detachably joining the guide to the support, and adjustable means mounted on the guide serving as optional supporting means therefor.

HUGH LONG.